United States Patent [19]

Croft et al.

[11] Patent Number: 4,707,010

[45] Date of Patent: Nov. 17, 1987

[54] INERTIAL LATCHING MECHANISM FOR SEAT ASSEMBLIES

[75] Inventors: George Croft; Martyn Hiscox, both of Mississauga, Canada

[73] Assignee: Canadian A.S.E. Limited, Downsview, Canada

[21] Appl. No.: 923,530

[22] Filed: Oct. 27, 1986

[30] Foreign Application Priority Data

Oct. 25, 1985 [CA] Canada .................................... 493889

[51] Int. Cl.⁴ .............................................. B60N 1/02
[52] U.S. Cl. .................................... 297/379; 297/216; 297/378
[58] Field of Search ............... 297/379, 378, 478, 480, 297/216

[56] References Cited

U.S. PATENT DOCUMENTS

| | | | |
|---|---|---|---|
| 2,732,003 | 1/1956 | Williams | 297/379 X |
| 3,549,202 | 12/1970 | Beechem et al. | 297/379 |
| 3,972,564 | 8/1976 | Arlenskas et al. | 297/378 |
| 4,010,979 | 3/1977 | Fisher et al. | 297/379 |
| 4,082,353 | 4/1978 | Hollowell | 297/379 |
| 4,103,967 | 8/1978 | Tanaka et al. | 297/216 |
| 4,118,067 | 10/1978 | Tanaka | 297/379 |
| 4,219,234 | 8/1980 | Bell | 297/374 |
| 4,252,370 | 2/1981 | Klueting et al. | 297/379 |
| 4,294,488 | 10/1981 | Pickles | 297/367 |
| 4,318,569 | 3/1982 | Bilenchi et al. | 297/379 |
| 4,358,155 | 11/1982 | Osterhold et al. | 297/379 |
| 4,365,838 | 12/1982 | Berg | 297/379 |
| 4,366,984 | 1/1983 | Klueting et al. | 297/379 |
| 4,390,208 | 6/1983 | Widmer et al. | 297/379 |
| 4,402,547 | 9/1983 | Weston | 297/379 |
| 4,429,919 | 2/1984 | Klueting | 297/379 |
| 4,438,974 | 3/1984 | Kresky et al. | 297/379 |

FOREIGN PATENT DOCUMENTS 562392  8/1958  Canada .................................. 297/379

Primary Examiner—James T. McCall
Attorney, Agent, or Firm—Rogers & Scott

[57] ABSTRACT

A seatback latching mechanism for use in a vehicle seat assembly having a backrest member pivotally tiltable over a seat member. The mechanism has a first latch means fixed relative to the seat member and a second latch means pivotally mounted on the backrest member for pivotal movement thereof between an unlatched and a latched position in which tilting movement of the backrest member over the seat member is restrained. Pendulum means are pivotally mounted on the backrest member for pivotal movement independently of the pivotal movement of the second latch means between first and second pendulum limit positions at which limit positions the pendulum means impinges upon the second latch means.

In the normal upright position of the backrest member, the pendulum means is gravity biased to the first limit position in which the composite center of gravity of the pendulum means and the second latch means is positioned eccentrically of the pivot axis thereby urging the second latch means towards the unlatched position. Upon the occurrence of a first vehicular deceleration force sufficient to overcome the gravity biasing of the pendulum means to the first limit position, the pendulum means pivotally moves to the second pendulum limit position thereby increasing the sensitivity of the mechanism to latching, such that, upon the attainment of a second greater vehicular deceleration force, the second latch means moves rapidly to the latched position thereof.

10 Claims, 6 Drawing Figures

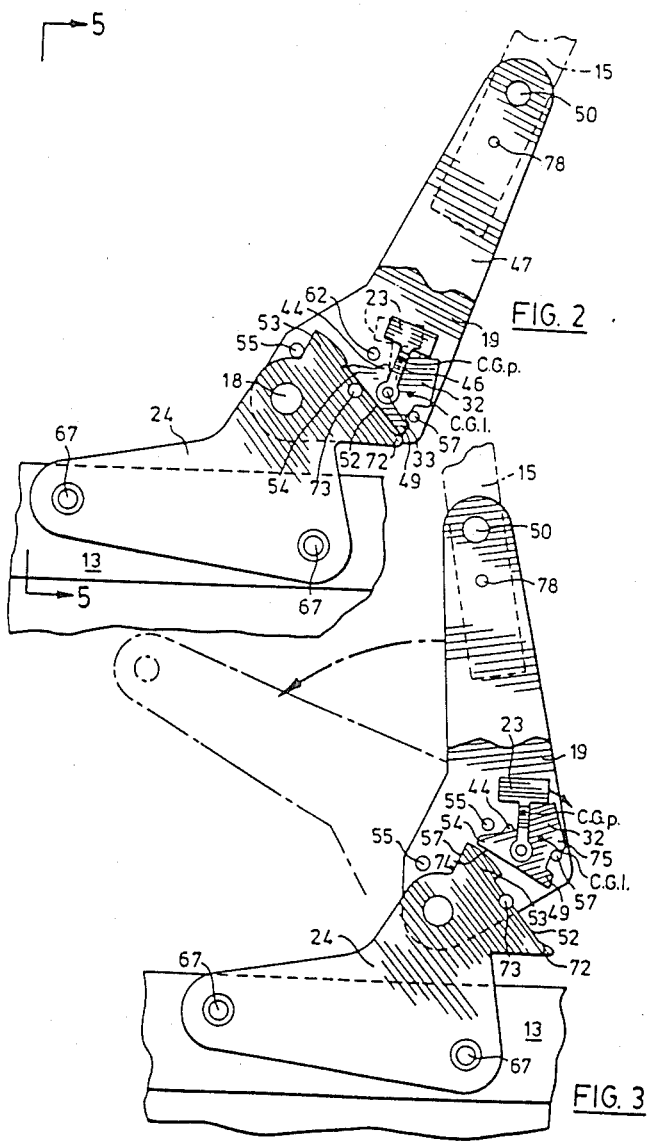

INERTIAL LATCHING MECHANISM FOR SEAT ASSEMBLIES

This invention relates to improvements in inertia latches such as are employed, for example, in vehicle seat assemblies.

The prior art is exemplified by U.S. Pat. No. 4,318,569, issued to Robert Bilenchi et al on Mar. 9, 1982, which discloses the use of an inertia latch mechanism for a vehicle seat assembly having a generally horizontal seat member and an upstanding backrest member pivotally supported on support arms for tiltable movement over the seat member. A latch pawl pivotally mounted on one of said members is maintained in a cam controlled latching attitude relative to a fixed detent on the other of the members. The latch pawl is constructed and arranged so that its center of gravity normally provides a force couple acting eccentrically of the pawl pivot axis to cause the latter to swing out of the controlled latching attitude in a direction to bypass the detent when moderate force is applied to the backrest member to tilt the latter over the seat member. Upon the occurrence of a vehicular deceleration rate sufficient to overcome the inertia of the seat backrest member normally resisting tilting movement of the latter over the seat member, the inertia latch pawl becomes a factor in causing the latch pawl to engage the detent to prevent tilting movement of the backrest member.

The Bilenchi inertia latch has been used commercially, but such use has emphasized several serious problems with its design. More specifically, when the backrest member is in the normal upright position, the latch pawl is cammed to a latching attitude which overcomes the gravity unlatching bias. However, upon downward inclination of the nose of the vehicle, as when parked on a hill, the center of gravity of the latch pawl shifts relative to its pivot in a direction decreasing the force couple responsible for gravity unlatching actuation, such that, where the downward inclination of the vehicle is over approximately 13°, the latch pawl fails to dependably accommodate forward tilting of the backrest member.

One attempt to overcome the problem of undesirable inclined latching is proposed by U.S. Pat. No. 4,438,974 issued on Mar. 27, 1984 to Fred C. Kresky et al. The Kresky patent teaches the use of an improved camming guide profile designed to reduce the clearance between the forward lobe of the latch pawl and the adjacent detent portion of the cooperating latch element so as to reduce the amount of radial free play in the locking mechansim, which excessive free play contributes to inclined latching. While some improvement in inclined unlatching performance is observed with the Kresky latch mechanism, the radial free play inherent in this design is still sufficient to cause reliability problems.

Moreover, unreliable unlatching in both the Bilenchi and Kresky designs is further aggravated by the compromised static positioning of the center of gravity of the latch pawls in both of these designs. That is, the positioning of the center of gravity of the Bilenchi and Kresky latch pawls has been chosen as a compromise between the preferred positions for optimal latching and unlatching performance. As a result, the compromised static positioning of the centre of gravity of these prior art latching mechanisms does not provide for a sufficiently high rotational moment about the pivot axis of the latch pawl during the unlocking action to ensure negation of normal frictional forces exerted upon the latch pawl by the adjacent componentry of the latching mechanism. Thus, binding or sticking of the latch pawl during the unlocking action is common in the prior art devices. The passage of time aggravates the situation, as the buildup of foreign material such as grease and dirt tends to increase the magnitide of such frictional forces.

An attempt to provide a dynamic centre of gravity can be seen in U.S. Pat. No. 4,219,234, issued on Aug. 26, 1980 to Robert L. Bell. The Bell patent teaches the positioning of a ball member in a cage positioned on the pivoting latch pawl, which ball member shifts the center of gravity of the pawl to enhance latching upon the occurrence of a specified vehicular deceleration. This device is not only difficult to manufacture, but is seriously prone to undesirable inclined latching. Moreover, the accumulation of grease and dirt in the ball cage progressively impedes the movement of the ball member with time, seriously affecting its sensitivity.

Excessive levels of radial free play inherent in the existing prior art inertia latching devices is also unacceptable from several standpoints. Under rapid deceleration of the vehicle, known inertia latch devices allow radial free play of the backrest of between 8°–11° before latching. Radial free play of this magnitude in an unoccupied seat is both annoying and distracting to the vehicle driver. Moreover, such radial free play causes excessive kinetic energy to be transferred from the seat back member to the occupant before latching. Such energy transfer significantly increases the likelihood of injury to the seat occupant.

It is an object of the present invention to provide an improved backrest latching mechansim which overcomes the above-mentioned difficulties associated with prior art inertia latch mechanisms. This is achieved by replacing the unitary latch pawl of the prior art with separate latching means and pendulum means. The pendulum means is movable between first and second limit positions, at which positions the mass of the pendulum means acts on the latching means, so as to shift the effective center of gravity of the latching means for optimal unlatching and latching performance, respectively. Latching devices constructed according to the invention not only exhibit improved downhill unlatching performance, but are capable of limiting radial free-play prior to latching to approximately 3°–4°. This improvement in unlatching performance is attributable to faster unlatching by the latching means, or shorter "drop off time" as that term is understood by those skilled in the art.

A backrest latching mechanism embodying the present invention is particularly adapted for use in a vehicle seat assembly having a seat member and a backrest member pivotally tiltable over the seat member. The latching mechanism comprises a first latch means fixed relative to one of said seat and backrest members and a second latch means pivotally mounted on the other of said members for pivotal movement thereof between an unlatched and a latched position. In the unlatched position the second latch means is positioned so as to avoid latching engagement with the first latch means upon tilting movement of the backrest member over the seat member. In the latched position the second latch means is positioned latchingly to engage with the first latch means to prevent tilting movement of the backrest member over the seat member. A pendulum means is pivotally mounted on the other of said seat and backrest members for pivotal movement independently of the pivotal movement of the second latch means between first and second pendulum limit positions, at which limit positions the pendulum means impinges upon the second latch means such that, in the normal upright position of the backrest member, the pendulum means is gravity biased to the first limit position so as to urge the second latch means towards the unlatched position. Moreover, upon the occurrence of a first vehicular deceleration force sufficient to overcome the gravity biasing of the pendulum means to the first limit position thereof, the pendulum means pivotally moves to the second limit position thereof, thereby increasing the sensitivity of the mechanism to latching, such that, upon the attainment of a second greater vehicle deceleration force, the second latch means moves rapidly to the latched position thereof.

In order that the invention may be readily understood, one embodiment thereof will now be described by way of example, with references to the accompanying drawings. In the drawings:

FIG. 2 is a fragmentary partial side elevational view of a latching mechanism according to the invention.

FIGS. 3 and 4 are views similar to FIG. 2, showing the latching mechanism in different operative conditions;

Figure 1:
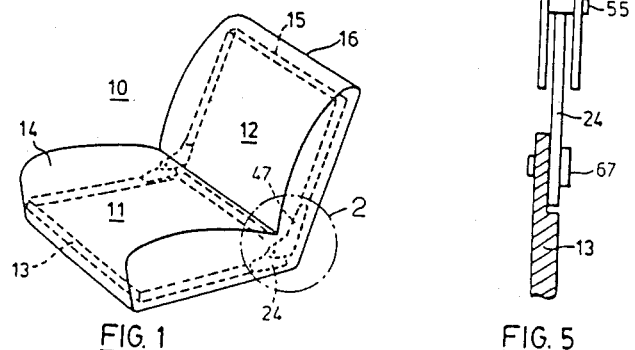
FIG. 1 is a perspective view of a vehicle seat having a seat member and a backrest member pivotally tiltable over the seat member, and further having a latching mechanism in accordance with the present invention mounted thereon, the backrest member being shown in the normal upright position.
Figure 5:
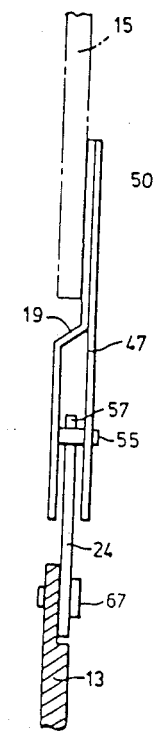
FIG. 5 is a sectional view along line 5—5 of FIG. 2.
Figure 6:
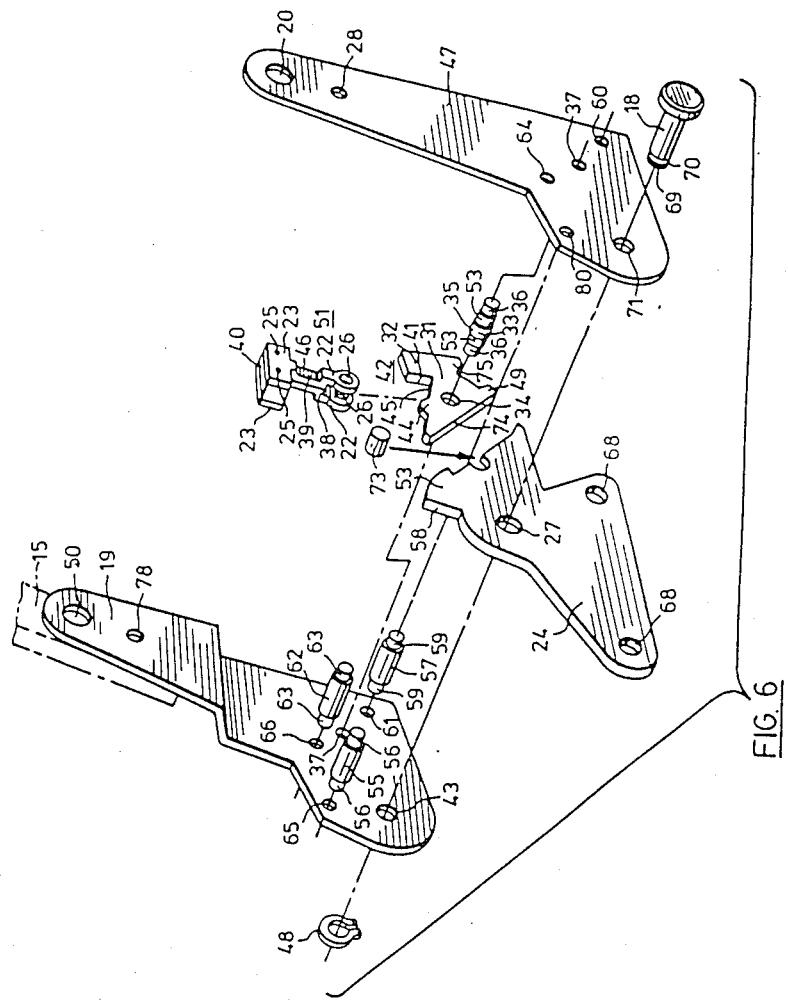
FIG. 6 is an exploded view of the latching mechanism of FIGS. 1-5.

FIG. 1 shows a typical vehicle seat assembly 10 of the general type with which the invention may be used. Such a seat assembly may be of the "bucket" type as illustrated, or may be of the well-known multi-occupant "bench" type. In the latter case, it is preferable to use one latching mechanism according to the invention at each of the two sides of the "bench" type seat assembly. With "bucket" type seat assemblies, it is generally sufficient to use a single latching mechanism for each seat assembly installed, for example, in circled area 2 of FIG. 1, and the perferred embodiment will be described with reference to such use, although it will be expressly understood by those skilled in the art that specific vehicle applications may call for the analogous use of two or more latching assemblies with each vehicle seating assembly.

The vehicle seat assembly of the Figures has a seat member 11 and a backrest member 12 which is pivotally tiltable over the seat member 11. The seat member 11 comprises a seat support frame 13 which is conventionally anchored to the floor panels (not shown) of the vehicle and which is covered in the usual manner with upholstery materials 14. The backrest member comprises a support frame 15 which is also covered in the usual manner with upholstery materials 16.

A hinge plate 19 is rigidly affixed to the backrest support frame 15 by bolts or other fastening means (not shown) which fastening means pass first through an aperture 20 in a cover plate 47, through an aperture 50 in the hinge plate 19 and thence through an aperture (not shown) in the backrest support frame 15. The cover plate 47 is also affixed to the hinge plate 19 by means of a rivet or other fastening means (not shown) which passes through aligned apertures 28 and 78 located respectively therein. It will be appreciated that the hinge plate 19 may, in place of the arrangement shown, be integrally formed with the support frame 15, or may be attached thereto by welding or any other suitable affixation means. Throughout this description of the preferred embodiment of the invention it will be apparent to those skilled in the art that additional rivets or other fastening means not illustrated in the drawings might be desirably added to give additional rigidity to the latching mechanism of the invention. However, the number and placement of such fastening means is a matter of routine design choice, and they have been omitted in order to simplify the drawings.

A first latch means comprising a latch plate 24 is rigidly affixed to the seat support frame 13 by means of rivets or other conventional fastening means 67 which pass through apertures 68 in the latch plate 24. A hinge pin 18, having a circumferential groove 70 adjacent its free end 69, acts as a pivot for the seatback member 12 and gives additional rigidity to the plate sandwich comprised by the latch plate 24 the cover plate 47 and the hinge plate 19 by passing through an aperture 71 in the cover plate 47, through aperture 27 in latch plate 24, and through aperture 43 in hinge plate 19. A C-shaped spring clip 48 engages the circumferential groove 70 to hold the hinge pin 18 in place. In this manner, the first latch means 24 is fixed relative to the seat member 11.

A second latch means generally designated by the reference number 42, and comprising a latch pawl 31 having a counterweight 32, is pivotally mounted on the hinge plate 19 of the backrest member 12 by means of a shouldered pivot pin 33 which serves as a pivot axis for the latch pawl 31. The pivot pin 33, preferably of hardened steel, has an enlarged central diameter portion 35 which passes through a correspondingly diametered aperture 34 in the latch pawl 31, to allow free pivotal movement of the pawl thereabout. A smaller diametered portion 36 is present at each end of the pivot pin 33, with each portion 36 being mounted in a respective one of aligned apertures 37, positioned one each in the hinge plate 19 and the cover plate 47. The counterweight 12 may, as shown, be integral with the main body of the latch pawl 31, or may be a separate component rigidly attached to the latch pawl 31.

A pendulum means, generally designated by the reference numeral 51, is pivotally mounted on the backrest member in a manner similar to the latch pawl 31, as will presently be described. The pendulum means 51 comprises a shaft portion 39, which is bifurcated at its lower end to define two arm portions 22, and is bi-furcated at its upper end to define two upper arm portions 23. A weight slug 40 is positioned between the upper arm portions 23, where it is held in place by means of weldment or other affixation means acting through apertures 25 positioned in the upper arm portions 23.

The lower arm portions 22 are spaced so as to overlie the underlying sides of the latch pawl 31. Each lower arm portion 22 presents a respective aligned aperture 26 which is sized so as to freely accommodate a respective intermediate portion 53 of the pivot pin 33 which passes therethrough, thereby accommodating free pivotal movement of the pendulum means 51 about the pivot pin 33.

All spacing to achieve centralisation of the latch pawl 31 and the pendulum means 51 is achieved by the shoulders on the pivot pin 33, which shoulders define the limits of the end diameter portions 36, the intermediate diameter portions 53 and the central enlarged diameter portion 33 of the pivot pin 33. Spacers, such as nylon washers, (not shown) may be used as necessary for the reduction of friction between the various components of the device, such as is well known in the art.

The base of the shaft portion 39 is defined by a shoulder 38, which shoulder 38 is positioned to contact a raised protuberance 44 on the upper edge 45 of the latch pawl 31 only when fully pivoted in the counter-clockwise direction (see the dotted outline of FIG. 2 and FIG. 4) so as to define a second limit position of the pendulum means 51. Similarly, the rear edge 46 of the shaft portion 39 is positioned to contact a leading edge 41 of the counterweight 32 only when fully pivoted in the clockwise direction (see solid outline of FIG. 2 and FIG. 3) so as to define a first limit position of the pendulum means 51. From the foregoing description and the accompanying Figures, it will be appreciated that the pendulum means 51 is pivotally mounted on the backrest member for pivotal movement independently of the pivotal movement of the latch pawl 31 between the first and second limit positions, at which positions the pendulum means 51 impinges upon the latch pawl 31.

A shouldered stop pin 55, preferably of hardened steel, has two end portions 56 of reduced diameter, which portions 56 are each mounted in a respective one of aligned apertures 65 and 80 positioned one each in the hinge plate 19 and the cover plate 47, respectively. The stop pin 55 contacts a forward surface 58 of the latch plate 24 when the backrest member 12 is pivotally tilted in the clockwise rearward direction of FIGS. 1-3, thereby preventing further clockwise tilting thereof and thereby defining the normal upright position of the backrest member 12 relative to the latch plate 24.

An additional stop pin 57, preferably of hardened steel, is positioned between the hinge plate 19 and the cover plate 47 to limit the pivotal movement of the latch pawl 31. This stop pin 57 has reduced diameter end portions 59 which are mounted, in a manner analagous to stop pin 55, in aligned apertures 60, 61 in the cover plate 47 and the hinge plate 19, respectively.

As previously mentioned, the pins 35, 55 and 57 are preferably hardened steel pins that take the heavy loads that must be absorbed during crash conditions. As illustrated, the three pins 33, 55 and 57 constitute a three point load distribution system. If a two point load distribution system is considered to be acceptable for a particular vehicle application, a conventional, shouldered rivet could be substituted for the hardened steel pin 57, such that the pin 57 would act as a stop for the latch pawl 31 in the FIG. 3 mode only, as will be described more fully below.

A shouldered rivet 62, of mild steel, and having reduced end diameters 63 is positioned between the cover plate 47 and the hinge plate 19 to provide spacing therebetween, the end diameters 63 extending through aligned apertures 64, 66 in the cover plate 47 and the hinge plate 19, respectively, such that, after assembly of the various components of the latching device, they may be burred over to assist in holding the plates 47, 19 in spaced relationship.

Figure 4:
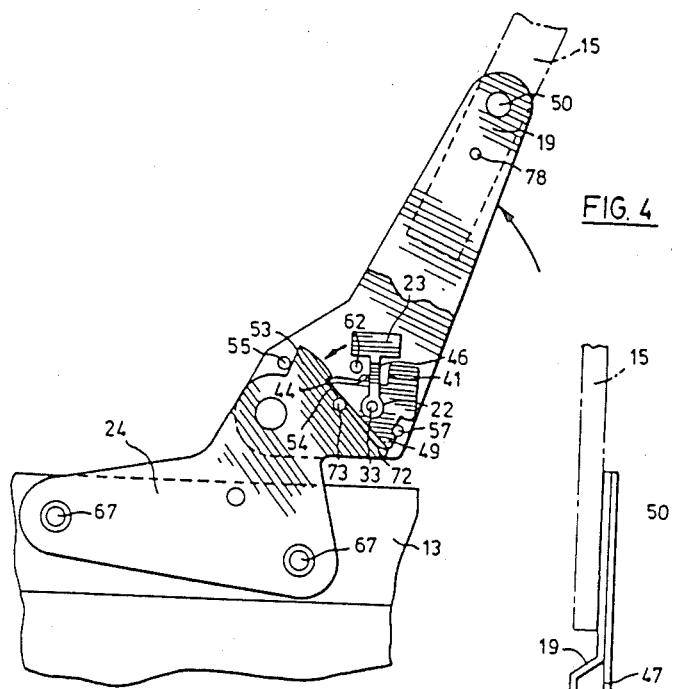

FIGS. 2, 3 and 4 illustrate the following operative positions of the latching mechanism, respectively: (1) latching mechanism attitude when the backrest member 12 is in the normal upright position; (2) latching mechansim attitude during slow, forward tilting of the backrest member, with the pendulum means 51 shown in solid lines in the first limit position; and (3) latching mechanism attitude during tilting of the backrest member 12 under conditions of rapid vehicular deceleration, with the pendulum means 51 in the second limit position.

Referring to FIG. 2, it will be seen that the pendulum means 51 is in the first limit position, shown in solid lines, whereat its center of gravity, as indicated by the legend "C.G.p.", is placed considerably to the right of the pivot pin 33, thus creating a first rotational moment tending to pivot the pendulum means 51 in a clockwise direction, as seen in FIG. 2. Similarly, the center of gravity of the latch pawl 31, as indicated by the legend "C.G.l", is to the right of the pivot pin 33, thus creating a second rotational moment tending to pivot the latch pawl 31 clockwise as seen in FIG. 2. The first rotational moment of the pendulum means 51 is transferred through the rear edge 46 of the shaft portion 39 to the leading edge 41 of the latch pawl 31. In this manner, both the first and second rotational moments tend to rotate the latch pawl 31 in the clockwise direction of FIG. 2, such that the weight of the pendulum means 51 acts on the second latch means 42 eccentrically of the pivot axis to urge the second latch means 42 towards the unlatched position thereof.

The latch plate 24 comprises a detent portion 53 adapted to engage a forward nose 54 of the latch pawl 31 upon forward pivotal tilting of the backrest member 12 under conditions of rapid vehicle deceleration as further specified below. The latch plate 24 preferably comprises a camming surface 52 adapted to interact with a cam-follower 49 positioned on the latch pawl 31 when the backrest member 12 is in the normal upright position. The camming surface 52 further comprises a raised terminal ramp portion 72, referred to in the industry as a "turkey spur". The terminal ramp portion 72 is positioned at the end of the latch plate 24 opposite to the detent portion 53. A cylindrical bumper element 73 of a resilient elastomer or plastic material is affixed to the camming surface 52 with its generally convex upper surface protruding above the level of the camming surface 52 so that the bottom surface 74 of the latch pawl 31 impinges upon it sufficiently to negate any radial free play of the latch pawl 31 that results from normal component tolerance accumulation when the backrest member 12 is in or close to its upright position. The resilience of the material of the bumper element 73 should be such that the memory thereof is slightly slower than the latching speed of the pawl 31 under conditions of rapid deceleration such as are experienced in a crash situation. In this manner, the bumper element 73 returns to its original form as quickly as possible without acting as a spring under the nose 54 of the latch pawl 31 when latching engagement thereof is required. The primary purpose of the bumper element 73 is to prevent excessive rattling of the latch pawl 31 against the camming surface 52 upon normal vehicular vibration. The interaction of the cam-follower 49 and the raised terminal ramp portion 72 causes the latch pawl 31 to substantially pivot towards its latched position so as to assist in the pivotal movement of the pendulum means 51 to the first limit position thereof upon return of the backrest member 12 to its normal upright position. This interaction ensures that the pendulum means 51 is "cocked" to the first limit position even when the vehicle is in a nose-down inclined attitude, and puts the nose 54 of the latch pawl 31 in a latching attitude with respect to the detent portion 67.

When the backrest member 12 is tilted over the seat member 11, as by the application of moderate manual force, as when it is desired to provide easier ingress or egress to the rear passenger compartment of the automotive vehicle, the pivot pin 33 is raised relative to the camming surface 52. The weight of the pendulum means 51 acting on the latch pawl 31 eccentrically of the pivot pin 33, as previously outlined, causes the latch pawl 31 and the pendulum means 35 to rotate in a clockwise direction, as seen in FIG. 3, as the cam follower 49 attempts to follow the camming surface 52. Initially, the cam follower 49 slides down the raised ramp portion 72 of the camming surface 52 onto the relatively flat portion thereof, but as the pivot pin 33 is raised higher with the backrest member 12, the cam follower 49 rises clear of the camming surface 52. The clockwise rotation of the latch pawl 31 and pendulum means 51 continues until it is arrested by the stop pin 57 which engages a stop feature 75 on latch pawl 31 so as to define an unlatched position of the latch pawl 31. At this unlatched position, the nose 54 of latch pawl 31 has moved upwardly out of alignment with the detent portion 53 so as to allow the nose 68 to slide over the detent portion 53 without latchingly engaging therewith as seen in FIG. 3. This movement of the latch pawl 31 allows full forward tilting of the backrest member 12 over the seat member 11.

FIG. 4 and the dotted outline in FIG. 2 illustrates the positioning of the pendulum means 51 and the latch pawl 31 upon rapid deceleration of the vehicle, as occurs, for example, under panic stop or frontal impact conditions. Upon the attainment of a first deceleration force sufficient to overcome the gravity biasing of the pendulum means 51 to the first limit position thereof, the inertia of the pendulum means 51 causes it to pivotally move about the pivot pin 33 to a second limit position (shown in dotted outline in FIG. 2) at which position the shoulder 38 of the pendulum arm 39 is in contact with the raised protuberance 44 on the latch pawl 31. At this first stage of the latching motion, the latch pawl 31 has not yet moved from the rest position shown in FIG. 2, and the C.G.p. is still positioned several degrees to the right of the axis of the pivot pin 33. The result of this movement of the pendulum means 51 from its first limit position to its second limit position is to increase the sensitivity of the pendulum means/latch pawl combination to latching, as the net rotational moment in the clockwise (i.e. unlatching) experienced by the latch panel pendulum combination 51,31 has been decreased. Accordingly, the magnitude of the counter-rotational force now required to cause latching of the latch pawl/pendulum combination 51,31, which force will be generated by the inertial effect of a further increase in the deceleration rate of the vehicle, has been decreased. Another way of looking at this increase in sensitivity to latching is to consider that the composite centre of gravity of the pendulum means/latch pawl combination 51,31 has shifted closer to the vertical by the movement of the pendulum means 51 to its second limit position, such that the combination is now responsive to a smaller increase in the deceleration force to effect latching of the latch pawl 31 than would be required prior to the movement of the pendulum means 51 to its second limit position.

As the deceleration rate of the vehicle increases, a second stage, shown in FIG. 4, will be attained where the deceleration force experienced by the latch pawl/pendulum means combination 31,51 is sufficient to overcome the inherent clockwise (unlatching) rotational moment of the combination, such that the nose 54 of the latch pawl 31 will, upon tilting of the backrest member 12, engage with the detent portion 53 of the hinge plate 24, thereby preventing further tilting movement of the backrest member 12 over the seat member 11.

To be an effective safety device it is obvious that inertial latching mechanisms must become fully latched at deceleration forces at, or, preferably below, the deceleration force that causes the backrest member 12 to pivot over the seat member 11. Most passenger vehicle manufacturers require inertial latching mechanisms to become fully latched at a deceleration force of 0.5 g. To meet this requirement, it is desirable to design the latching mechanism herein to have the pendulum means 51 pivotally move to the second limit position below this value, at, for example 0.3 g. In this manner, the latching mechanism of the invention is set for fast and immediate action once the 0.5 g. deceleration force is achieved. As the device is more sensitive to latching than prior art devices, it latches faster and therefore has less inherent radial freeplay. Accordingly, full latching can be achieved with radial freeplay of the backrest member 12 of as low as 3°.

Return of the backrest member 12 to the normal upright position and removal of the deceleration force acting upon the pendulum means 51 to return to its first limit position so as to be ready for fast, positive unlatching action under a moderate tilting force. Thus, the design of the instant invention provides an inertial latching mechanism designed for optimum unlatching action (i.e. fast rotation and high rotational moment) in the unlatching direction, with a minimum amount of the radial movement between the cocked and latched conditions without jeopardising the sensitivity of the mechanism to latching at a specific deceleration force.

It will be understood that the invention is not to be limited to the exact construction shown and described, but that various changes and modifications may be made without departing from the spirit and scope of the invention as defined in the appended claims. For example, the desired g value sensitivities are readily varied by changing the profiles of the latch pawl 31 and the pendulum means 51 so as to change the relative mass distributions thereof, but, such changes are a matter of mere design choice readily determined through appopriate calculations by a person skilled in the relevant art.

We claim:

1. In a vehicle seat assembly having a seat member and a backrest member pivotally tiltable over the seat member, a backrest latching mechanism comprising:

a first latch means fixed relative to one of said members;

a second latch means pivotally mounted on the other of said members for pivotal movement thereof between an unlatched position in which the second latch means is positioned so as to avoid latching engagement with the first latch means upon tilting movement of the backrest member over the seat member and a latched position in which said second latch means is positioned latchingly to engage with the first latch means to prevent tilting movement of the backrest member over the seat member;

pendulum means pivotally mounted on the other of said members for pivotal movement independently of the pivotal movement of the second latch means between first and second pendulum limit positions, at which limit positions the pendulum means impinges upon the second latch means;

whereby, in the normal upright position of the backrest member, the pendulum means is gravity biased to the first pendulum limit position so as to urge the second latch means towards the unlatched position thereof; and whereby, upon the occurrence of a first vehicular deceleration force sufficient to overcome the gravity biasing of the pendulum means to the first limit position thereof, the pendulum means pivotally moves to the second pendulum limit position thereby increasing the sensitivity of the mechanism to latching, such that, upon the attainment of a second greater vehicular deceleration force, the second latch means moves rapidly to the latched position thereof.

2. A backrest latching mechanism according to claim 1 wherein the pendulum means is pivotally mounted on the other of said members by means of a pivot pin affixed to the second latch means.

3. A backrest latching mechanism according to claim 1 wherein the pendulum means and the second latch means are pivotally mounted on the other of said members for pivotal movement independently of one another by means of a single pivot pin affixed to the other of said members.

4. A backrest latching mechanism according to claim 3 wherein the first latch means is fixed relative to said seat member and the second latch member and the pendulum means are mounted on the backrest member.

5. A backrest latching mechanism according to claim 4 wherein the first latch means comprises a detent portion adapted to latchingly engage said second latch means when the latter is in the latched position and a camming surface adapted to interact in the normal upright position of the backrest member with a cam-follower positioned on the second latch means so as to partially pivot the second latch means towards the latched position thereby to assist movement of the pendulum means to the first limit position.

6. A backrest latching mechanism according to claim 5 wherein a resilient spacer member having a generally convex uppor surface is positioned on the first latch means between said detent portion and said camming surface.

7. A backrest latching mechanism for use in a vehicle seat assembly having a backrest member pivotally tiltable over a seat member, said latching mechanisms comprising:

a first latch means fixed relative to said seat member;

a second latch means pivotally mounted on the backrest member for pivotal movement thereof between an unlatched position in which the second latch means is positioned so as to avoid latching engagement with the first latch means upon tilting movement of the backrest member over the seat member and a latched position in which said second latch means is positioned latchingly to engage with the first latch means to prevent tilting movement of the backrest member over the seat member;

pendulum means pivotally mounted on the backrest member for pivotal movement independently of the pivotal movement of the second latch means between first and second pendulum limit positions at which limit positions the pendulum means impinges upon the second latch means;

whereby, in the normal upright position of the backrest member, the pendulum means is gravity biased to the first limit position in which the composite centre of gravity of the pendulum means and the second latch means is positioned eccentrically of the pivot axis thereby to urge the second latch means towards the unlatched position thereof; and whereby, upon the occurrence of a first vehicular deceleration force suffucient to overcome the gravity biasing of the pendulum means to the first limit position thereof, the pendulum means pivotally moves to the second pendulum limit position thereby increasing the sensitivity of the mechanism to latching, such that, upon the attainment of a second greater vehicular deceleration force, the second latch means moves rapidly to the latched position thereof.

8. A backrest latching mechanism according to claim 7 wherein the pendulum means and the second latch means are pivotally mounted on the backrest member for pivotal movement independently of one another by means of a single pivot pin affixed to the backrest member.

9. A backrest latching mechanism according to claim 8 wherein the first latch means comprises a detent portion adapted to latchingly engage said second latch means when the latter is in the latched position and a camming surface adapted to interact in the normal upright position of the backrest member with a camfollower positioned on the second latch means so as to partially pivot the second latch means towards the latched position thereby to assist movement of the pendulum means to the first limit position.

10. A latching member according to claim 9 wherein a resilient spacer member having a generally convex upper surface is positioned on the first latch means between said detent portion and said camming surface.

* * * * *